Feb. 6, 1962 R. N. RHODES 3,020,338

COLOR TELEVISION DEMODULATION SYSTEM

Original Filed July 9, 1954 2 Sheets-Sheet 1

INVENTOR.
Roland N. Rhodes
BY
[signature]
ATTORNEY

INVENTOR.
Roland N. Rhodes
BY
[signature]
ATTORNEY

United States Patent Office 3,020,338

Patented Feb. 6, 1962

3,020,338

COLOR TELEVISION DEMODULATION SYSTEM

Roland N. Rhodes, Levittown, Pa., assignor to Radio Corporation of America, a corporation of Delaware Continuation of application Ser. No. 442,326, July 9, 1954. This application Aug. 2, 1957, Ser. No. 677,177
5 Claims. (Cl. 178—5.4)

The present invention relates to matrix and demodulating circuits, and more particularly to matrix and demodulating circuits of the type employed in color television receivers. This application is a continuation of application Serial No. 442,326, filed July 9, 1954.

Color images may be transferred electrically by analyzing the light from an object into not only its image elements, as is accomplished by normal scanning procedure, but also by analyzing the light from elemental areas of the image into the selected primary or component colors and thereby deriving therefrom a signal representative of each of the selected color components. A color image may then be reproduced at a remote point by appropriate reconstruction from a component color signal train.

The color proposed for transmitting a color television image is one based on a set of standards which were authorized by the Federal Communications Commission on December 17, 1953. These standards describe a composite color television signal which contains both the luminance information or monochrome information relating to the scene and also a color modulated subcarrier which uses the processes of synchronous detection may be employed to provide color-difference or chrominance signals which describe how each color in the televised scene differs from the monochrome version of the color having the same luminance. It is therefore necessary in a color television receiver to provide means for not only demodulation of the component color-difference or chrominance information, but also to provide matrix circuits which can be utilized to produce suitable combinations of chrominance signals so as to produce a desired set of color-difference signals which, when combined with the monochrome information, yield the recovered component color signals.

The present invention is devoted to a teaching of combined simplified demodulating and matrix means which accomplish this purpose in a novel and direct fashion.

In order to best appreciate the teachings of the present invention, consider in more detail the precise nature of the composite color television signal which conforms to the Federal Communications Commission standards. Three primary colors, red, green, and blue are utilized for a description of the color residing in the image to be transmitted. These three primary colors do not appear equally bright because they are located in different parts of the spectrum and hence stimulate the brightness sensation by different amounts. However, if the three primary colors are mixed in the right proportions, it is found that the green primary, which is located at the center of the visible spectrum, accounts for 59% of the brightness sensation while the blue and red primaries account for 11% and 30% respectively. Thus utilizing a color television signal or Y signal according to the equation $$Y=0.30R+0.59G+0.11B \qquad (1)$$

a monochrome signal may be produced; this monochrome signal is generated in accordance with the existing scanning standards; i.e. 525 lines, 60 fields per second and 30 frames per second and treating it exactly like a standard monochrome signal with respect to bandwidth and the addition of synchronizing and blanking pulses.

In order to produce color pictures for the color transmission to a color receiver, it is necessary to produce at least three color-different signals. These color signals are designated as $R-Y$, $G-Y$, and $B-Y$ and indicate, as previously described, how each color in the televised scene differs from the Y signal.

These color-difference signals may be written in the following way to constitute a set of three independent signals:

$$R-Y=0.70R-0.59G-0.11B \qquad (2)$$

$$G-Y=-.30R+0.41G-0.11B \qquad (3)$$

$$B-Y=0.30R-0.59G+0.89B \qquad (4)$$

where Y is described by Equation 1. These equations cannot be solved for R, G, and B in terms of $R-Y$, $G-Y$, and $B-Y$, but they may be solved to yield any single color-difference signal in terms of the other two; for example $$G-Y=-0.51(R-Y)-0.19(B-Y) \qquad (5)$$

The chrominance or color-difference signal information is transmitted on a modulated subcarrier which contains not only the signals described by Equations 2, 3, and 4, but also information relating to a continuous change of hue as a function of angle in the modulated color subcarrier. The process of recovering one or more of the color-difference signals is to utilize the principles of synchronous detection wherein a locally generated signal in the receiver having the frequency of the color subcarrier but a particular phase relating to the particular color-difference signal being detected, is heterodyned with the modulated color subcarrier to produce the desired color-difference signal. If a multiplicity of color-difference signals are required, then a series of heterodyning signals must be provided, each accurately phased with respect to the corresponding color-difference signal demodulated.

In order to make the employment of the processes of synchronous detection possible, synchronizing means are provided which utilize a color synchronizing burst which is transmitted on the back porch of the horizontal synchronizing pulse. This color synchronizing burst has the frequency, 3.58 mc. of the color subcarrier, and is phased with respect to the color-different signals in a manner whereby, for example, the color synchronizing burst leads the $R-Y$ signal by 90°, the $R-Y$ signal leading the $B-Y$ signal by 90° and the $G-Y$ signal by 214.3°.

If a multiplicity of color-difference signals are required, then the processes of synchronous detection may be utilized to provide these signals. However, following from the concepts leading to Equation 5, for example, it is not necessary to demodulate more than two color-difference signals; the third color-difference signal being readily obtainable from suitable combination of the two demodulated color-difference signals. The teachings of the present invention are devoted to the principles and concepts which provide simplified demodulator and matrix means which yield a trio of required color-difference signals from a modulated color subcarrier in a manner involving not only new and novel concepts, but also simplification of circuitry, D.-C. coupling, directness of approach, and ease in adjustment.

It is an object of the invention to provide a combined simplified demodulator and matrix.

It is an object of the present invention to provide a matrixed demodulator for providing a trio of color-difference signals.

It is yet another object of this invention to provide a combined demodulator and matrix which simultaneously demodulates two color signals of prescribed phase to yield a trio of predetermined color-difference signals.

It is yet another object of this invention to provide a simplified means for obtaining $R-Y$, $G-Y$, and $B-Y$ signals from a modulated color subcarrier.

It is yet a further object of this invention to provide a pair of color demodulators which are matrixed in a manner which provides a trio of color-difference signals.

According to the invention, a pair of color demodulators are utilized, each having an output circuit capable of yielding both positive and negative versions of demodulated color-difference signals. The terminals of each of the color demodulators which yield negative versions of demodulated color-difference signals are coupled together to provide a third output circuit and the phases of the color demodulating signals are so chosen that in addition to a prescribed pair of color-difference being produced respectively at the outputs of each of the color demodulators corresponding to the positive versions of these signals, the output circuit formed by the combined outputs of the color demodulators which each yield negative versions of these signals produce the third color-difference signal.

In one form of the invention a pair of diode balanced detector circuits are utilized each of which include circuitry whereby positive and negative versions of detected color-difference signals will be formed. By combining the circuits corresponding to the negative versions of the demodulated color-difference signals in the manner previously described in the preceding paragraph and by choosing, for example, demodulating signal angles whereby the demodulating signal applied to one of the demodulators lags the $R-Y$ signal by approximately 15° with the demodulating signal applied to the second color demodulating circuit lagging the $R-Y$ signal by approximately 60°, the output circuit made up of the combined negative output circuits can be caused to yield the $G-Y$ signal with the $R-Y$ signal and the $B-Y$ signal obtainable from the positive output sections respectively of the two color demodulators.

Other and incidental objects and advantages of the invention will become apparent from a reading of the following specification and an inspection of the accompanying drawings in which.

Figures 1, 2, 3:
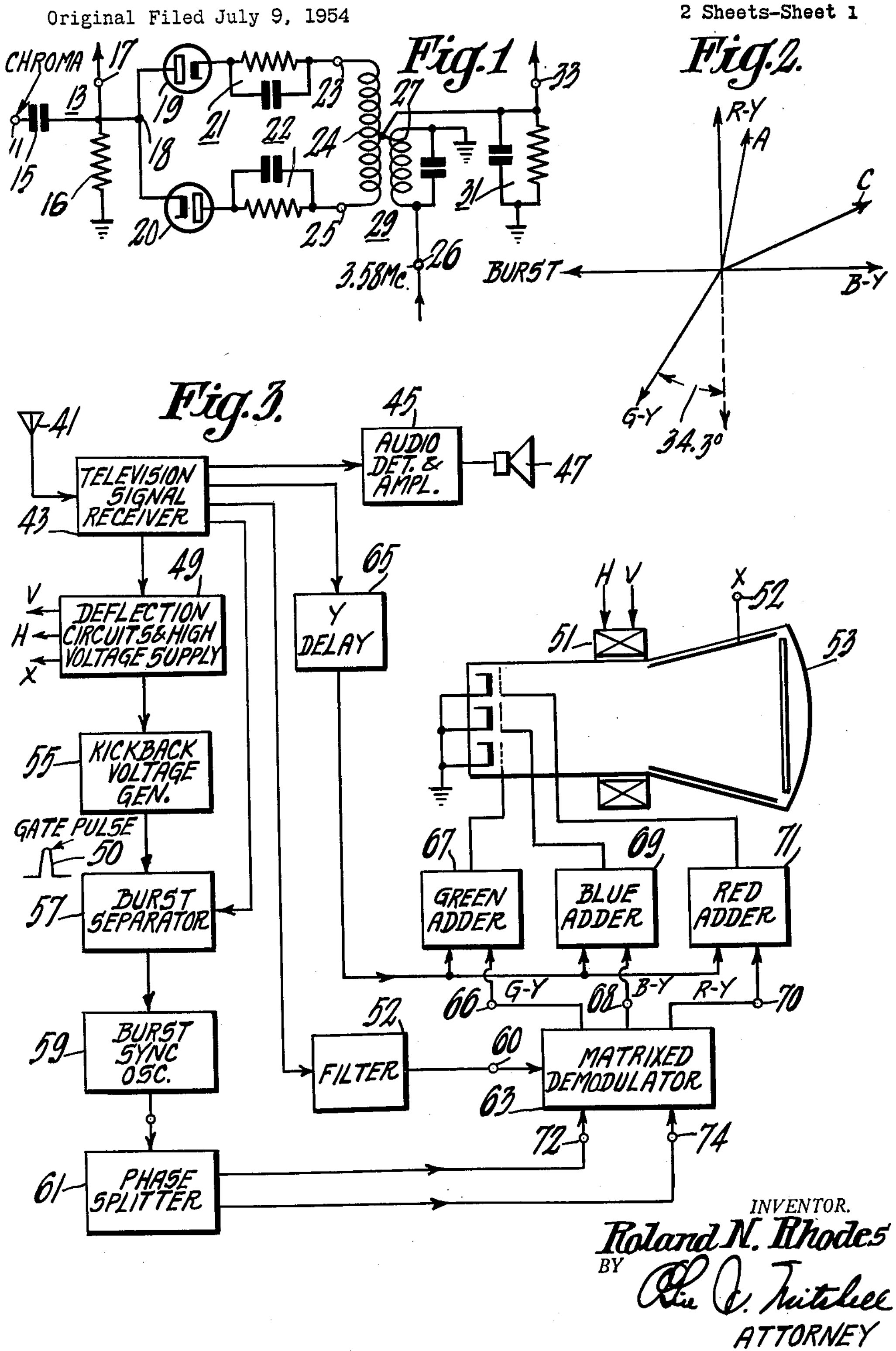
FIGURE 1 shows a balanced double diode color demodulator which is adapted to yield both positive and negative versions of a demodulated color-difference signal.
FIGURE 2 shows a vector diagram which relates the phase angles of the various signals which are associated with the teachings of the present invention.
FIGURE 3 shows a block diagram of a color television receiver which employs one embodiment of the present invention.

The circuit shown in FIGURE 1 describes the schematic diagram of a two-diode balanced type of demodulator circuit which is adapted to yield both positive and negative versions of a demodulated color-difference signal. The operation of this circuit may be described briefly in the following manner. The chroma or color subcarrier is applied to the input terminal 11 and through the condenser 15 to the anode of diode 19 and the cathode of diode 20. Simultaneously a local oscillator signal or demodulating oscillation of proper phase is applied to the input terminal 26, and by transformer action, a signal having the phase of the desired color-difference signal appears at the terminal 23 with the terminal 25 due again to transformer action displaying a local oscillator signal 180° out of phase with respect to the signal appearing at the terminal 23. Because of the 180° difference in phase between the local oscillator signals appearing at the terminals 23 and 25 which represent the end terminals of a transformer winding 24, the cathode of the diode 19 is caused to go negative in potential as the anode of the diode 20 is caused to go positive. Due to this action, both diodes 19 and 20 will conduct at the same time. A sampling action will take place of the chroma signal which is being delivered to the anode of the diode 19 and the cathode of the diode 20, this sampling action taking place at a time interval which corresponds to substantially the peak of the demodulating local oscillator signal having the phase of the desired color-difference signal. A decay network 13 made up of the condenser 15 and the resistor 16 is then coupled from the terminal 18 to ground, the terminal 18 representing the common terminal of the anode of the diode 19 and the cathode of the diode 20. In like fashion, a decay network 31 is connected between the mid terminal 27 of the transformer winding 24 and ground. Note too that decay networks are connected between the cathode of the diode 19 and the terminal 23 and between the anode of the diode 20 and the terminal 25. These decay networks serve to yield bias voltages which permit accurate sampling of the envelope of the chroma wave at desired intervals corresponding to the phase of the desired color-difference signal. The decay network 31 will follow the envelope sampling to yield a positive version of the demodulated color-difference signal and the decay network 13 follow the envelope sampling process to yield a negative or reversed phase version of the demodulated color-difference signal. By making the magnitude of the decay networks 13 and 31 the same, it is possible, if desired, to cause the amplitudes of the positive and negative versions of the demodulated color-difference signal to be substantially the same. The production of both positive and negative versions of the demodulated color-difference signal clearly follows from the fact that the ground terminal to which the decay network 13 is connected substantially completes the connection to the ground terminal to which the decay network 31 is connected thereby completing a loop consisting of the decay network 31, the decay network 13 and the two paths which are associated respectively with the diode 19 and the diode 20. Because during the sampling operation there is dissimilarity of charge experience by the capacitors on each side of the diodes, the connections are such whereby the decay network 31 will then develop the positive version of the envelope-amplitude-indicative signal which is the demodulated color-difference signal and the decay network 13 will yield the inverse polarity or negative version of this envelope-amplitude-indicative signal.

It is to be noted that the circuit described in FIGURE 1 for producing both positive and negative versions of the demodulated color-difference signals is only one of many circuits which may be employed. If, for example, only a single diode path were employed, suitable circuit connections would cause the single diode demodulator to still function as a plus-minus type of demodulator. It is the plus-minus demodulator action which is important to the present invention, in the particular circuit involved. However, the circuit shown is an excellent one for performing the process of plus-minus color-difference signal demodulation and will be also employed in the circuit to be described in FIGURE 4.

FIGURE 2 shows several of the many hues which are contained in the color subcarrier illustrating, for example, the $R-Y$ and the $B-Y$ color-difference signals which are in the quadrature with the $R-Y$ color-difference signal, in quadrature with the burst. The $G-Y$ signal is seen to lag the $B-Y$ signal by 124.3°. In vector diagrams of the type shown in FIGURE 2 the angle yields an indication of hue whereas the amplitude of the particular vector serves to yield an indication of saturation. It then follows that any demodulation of signals from the color subcarrier must take into consideration the angles of the desired hues.

Consider now the block diagram of the color television receiver shown in FIGURE 3. Here the incoming signal arrives at the antenna 41 and is applied to the television signal receiver 43. The television signal receiver 43 then delivers a recovered color television signal including the sound information, which is transmitted on a sound carrier 4½ mcs. removed from the picture carrier. The television signal receiver 43 includes the functions of first detection, intermediate frequency amplification, second detection and automatic gain control. Many of these functions are described in chapter 22 of the book "Harmonics, Sidebands and Transients in Communication Engineering," by C. Louis Cuccia, published by the McGraw-Hill Book Company in 1952.

The sound information may be recovered by using, for example, the well known principles of intercarrier sound, in the audio detector and amplifier 45; the recovered information is then applied to the loud speaker 47.

The color television signal information relating to the image is accommodated in at least four channels of the color television receiver, these channels being adapted to produce the recovered color signals which are applied to the color kinescope 53.

One branch emanating from the television signal receiver 43 is concerned with the picture synchronizing signals. This branch is applied to the deflection circuits and high voltage supply 49 which delivers deflection signals to the yokes 51, in addition to a high voltage signal to the ultor 52. Another function of the deflection circuits and high voltage supply 49 is to activate the kickback voltage generator 55. The kickback voltage generator 55 is usually a winding which is included on the high voltage supply transformer; it has the function of providing a gating pulse 50 during the horizontal blanking period.

Another branch emanating from the television signal receiver 43 is impressed on the burst separator 57 upon which is also impressed the kickback pulse 50. The kickback pulse is timed whereby it opens a burst gate during the duration interval of the color synchronizing burst thereby causing burst separation. The separated burst is then fed by the burst separator 57 to the burst synchronized oscillator 59 which, utilizing the separated burst and the kickback pulse 50, produces a local oscillator signal which is accurately synchronized with the phase and frequency of the color synchronizing burst.

Another branch emanating from the television signal receiver 43 is applied through the filter 52 to the matrixed demodulator 63. The filter 52 should be capable of providing a pass band in at least the range of frequencies from 3.9 to 4.2 mcs. At the same time, the burst synchronized oscillator 59 is delivering a pair of synchronized synchronous detection signals to the matrixed demodulator 63 by use of the phase shifter 61. In the matrixed demodulator 63, synchronous detection and filtering of a group of color-difference signals is realized. These color-difference signals may be $G-Y$, $R-Y$ and $B-Y$ signals, for example, or any group of signals which may be suitable for eventual reconstruction of component color image information.

The fourth branch which emanates from the television signal receiver is the Y or luminance channel. The Y signal information is passed through the Y delay line 65 and applied simultaneously to the red adder 71, the green adder 67 and the blue adder 69 to which are also applied the corresponding color-difference signals thereby causing the production of component red, green, and blue signals which are applied to appropriate control grids of the color kinescope 53.

Figure 4:
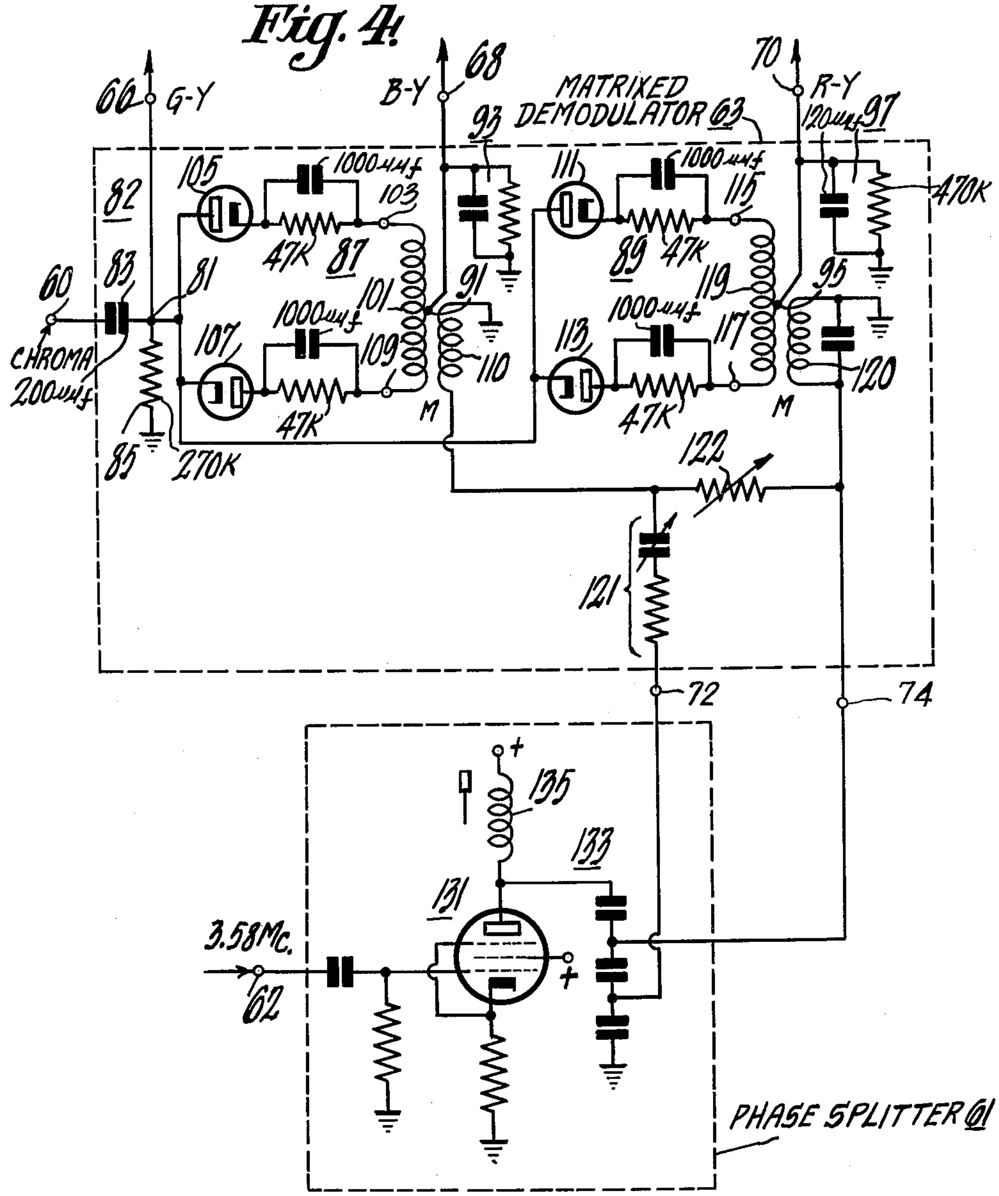
FIGURE 4 shows a schematic diagram of a matrix demodulator according to the present invention.

Consider now the detailed operation of the matrix demodulator 63 and the phase splitter 61 whose schematic diagrams are shown in FIGURE 4. The matrixed demodulator 63 has an input terminal 60 to which the filtered chroma is supplied. The matrixed demodulator 63 is seen to include a pair of demodulator circuits of the type described in connection with FIGURE 1. These two demodulator circuits bear the designators 87 and 89 respectively and are seen to have a common terminal, namely terminal 81. The demodulators 87 and 89 have individual detected signal output circuits 93 and 97, respectively, and have a common opposite-polarity detected signal output circuit 82.

Consider first the demodulator 87. If, for example, the $B-Y$ phased local oscillator demodulating signal is developed at the transformer terminal 109 with the signal developed at transformer terminal 103 bearing an inverse phase relationship to this signal developed at transformer terminal 109, then a $B-Y$ signal will be developed at the output terminal 68 due to the action of the decay network 93 which will yield the positive version of the $B-Y$ signal. If the demodulator 89 is temporarily removed from the circuit, then a negative version of the $B-Y$ signal will be developed at the terminal 81 and at the output terminal 66 due to the decay network 82, consisting of the condenser 83 and the resistor 85, following the envelope sampling of the diodes 107 and 105.

In like fashion if demodulator 87 is temporarily removed from the circuit and the demodulator 89 operated alone in conjunction with the input terminal 81, and if the phases of the demodulating oscillations or signals applied to transformer terminals 115 and 117 are suitable to produce a positive version of the $R-Y$ signal at the output terminal 70, then a negative version of the $R-Y$ signal will be developed at the terminal 81.

It then follows from the preceding paragraph that if a $G-Y$ signal is desired, then the demodulator circuit 87 and the demodulator circuit 89 may be combined to have a common negative signal terminal 87 to yield a $G-Y$ signal provided that negative versions of the $R-Y$ and $B-Y$ signals are added at the terminal 81 in accordance with the amplitudes prescribed by Equation 5.

The $G-Y$ signal can be produced at the terminal 66 by devising, for example, a system whereby the impedance of the decay networks 97 and 82 are so proportioned that when an $R-Y$ signal is produced at output terminal 70, a signal having the proportion $-.51(R-Y)$ is produced at the terminal 81. If the decay networks 93 and 82 are also proportioned to yield a $-.19(B-Y)$ signal at terminal 81 when a $B-Y$ signal is being produced at output terminal 68, then it follows that a $G-Y$ signal will be produced at the output terminal 66; however, it is evident, for example, that when an $R-Y$ signal is produced at the output terminal 70, thereby producing a $-.51(R-Y)$ signal at terminal 81, because of the switching action of the demodulators employed in demodulator 87, a $-.51(R-Y)$ signal will also be produced at the output terminal 68 which also yields $B-Y$ information. This may be avoided by sampling the $B-Y$ information at not the $B-Y$ phase shown in FIGURE 2, but actually at the C phase which leads the $B-Y$ phase by approximately 30°. It follows from elementary consideration of trigonometry that this will yield, approximately, a $+.51(R-Y)$ signal at the output terminal 68 which will then cancel the $-.51(R-Y)$ signal developed there due to the $-.51(R-Y)$ signal produced at the terminal 81. In like fashion, it follows that when a $B-Y$ signal is produced at the output terminal 68 and a $-.19(B-Y)$ signal is also produced at terminal 81, because of the switching action of the demodulator 89, $-.19(B-Y)$ will also be produced at the output terminal 70 at which the $R-Y$ appears. This action may be avoided to a first approximation, for example, by then sampling the $R-Y$ signal at not the $R-Y$ phase shown in FIGURE 2, but actually at the A phase which lags the $R-Y$ phase by approximately 15°, thereby leading to the production of a $+.19(B-Y)$ signal at the output terminal 70 which will cancel the $-.19(B-Y)$ signal arriving from the $-.19(B-Y)$ signal produced at terminal 81. These angles utilized are approximations which show clearly the manner by which the circuit operates so that anomalous voltages do not appear at any of the output terminals. The actual angles employed are those which permit mutual operation of the $R-Y$ and $B-Y$ demodulator circuits and are slightly different from the angles involved in the above discussion. Depending upon one set of circuit parameters actually utilized, the A phase was found to lag the $R-Y$ phase by approximately 13° with the C phase lagging the A phase by approximately 50.6°. Actually for every combination of output impedances, corresponding to output signal amplitudes, there is a combination of demodulating phases which will yield the desired outputs.

The output impedances shown in FIGURE 4 are suitable for yielding output voltages which are suitable for driving a color kinescope.

The circuit involved in the phase shifter 61 shows one means for obtaining proper relative demodulating phases. The 3.58 mc. signal, applied to terminal 62, is amplified in tube 131 and applied to the terminals 72 and 74. The transformer primary circuit 120 which is coupled to terminal 74 is tuned to parallel resonance with the circuit coupled to terminal 72, which, made up of the transformer primary 110 in combination with the condenser and resistor 121, is tuned to series resonance with subcarrier frequency. The resistor 122 is then adjusted to bring the phases into proper relationship. The resistor 122 may be operated in conjunction with a master phase control elsewhere in the circuit to yield complete control of the phases of the signals applied to the demodulators.

I claim:

1. In a color television system, means to demodulate a chrominance signal consisting of a color modulated carrier wave to provide demodulated signals corresponding to three desired predetermined phases of the chrominance signal, comprising, two synchronous demodulators, each of said demodulators having a separate individual output circuit means for providing a detected signal of given polarity, the detected signals from the two output circuit means corresponding with two of said three predetermined phases of the chrominance signal, said demodulators also having an output circuit means common to both demodulators for providing a combined detected signal of opposite polarity corresponding with the third of said predetermined phases of the chrominance signal, means to couple said chrominance signal to both of said demodulators, a source of demodulating oscillations having the same frequency as said carrier wave, and means to couple two selected phases of said oscillations to respective ones of said demodulators, each of said two selected phases being different from each of said three predetermined phases of the chrominance signal, the phases being selected so that the interaction between said demodulators due to said common output circuit means causes the demodulated signals in the three output circuit means to correspond with the three predetermined desired phases of the chrominance signal.

2. In a color television receiver including a source of a chrominance signal comprising phase and amplitude modulated color subcarrier waves, the modulation of said color subcarrier waves being such that demodulation of said waves at a first predetermined phase will produce a *R—Y* signal, demodulation of said waves at a second predetermined phase will produce a *B—Y* signal, and demodulation of said waves at a third predetermined phase will produce a *G—Y* signal, said receiver also including a source of reference oscillations of color subcarrier frequency, and color image reproducing apparatus adapted to reproduce color images in response to the delivery of *R—Y*, *B—Y*, and *G—Y* signals, respectively, to respective first, second and third input terminals thereof, a color demodulator system comprising in combination: first and second demodulating means each having separate output circuit means for developing respectively different first and second color signal outputs, means for applying reference oscillations from said source to said first demodulating means in a fourth predetermined phase different from any of said first, second and third predetermined phases, means for applying reference oscillations from said source to said second demodulating means in a fifth predetermined phase different from any of said first, second, third and fourth predetermined phases, means for applying modulated, color subcarrier waves from said chrominance signal source to each of said first and second demodulating means, and common output circuit means coupled to both of said first and second demodulating means for providing a third color signal output and for causing interaction between said first and second demodulating means such that the first color signal output produced in the separate output circuit means of said first demodulating means corresponds to one of said *R—Y*, *G—Y* and *B—Y* signals, the second color signal output produced in the separate output circuit means of said second color demodulator means corresponds to a second one of said *R—Y*, *G—Y* and *B—Y* signals, and the third color signal output produced in the common output circuit means of both of said first and second demodulating means corresponds to the remaining one of *R—Y*, *G—Y* and *B—Y* signals, and means for coupling said first, second and third input terminals to the respectively appropriate output circuit means.

3. A color demodulating system in accordance with claim 2 wherein the fourth predetermined phase in which reference oscillations are applied to said first demodulating means is intermediate said first and second predetermined phases, and the fifth predetermined phase in which reference oscillations are applied to said second demodulating means is intermediate said fourth predetermined phase and said second predetermined phase, and wherein the interaction between said first and second means provided by said common output circuit means results in the production of said R—Y signal in the separate output circuit means of said first demodulating means, the production of said B—Y signal in separate output circuit means of said second demodulating means, and the production of said G—Y signal in said common output circuit means; said first input terminal being coupled to the separate output circuit means of said first demodulating means, said second input terminal being coupled to the separate output circuit means of said demodulating means, and said third input terminal being coupled to said common output circuit.

4. In a color television receiver including a source of a chrominance signal comprising phase and amplitude modulated color subcarrier waves representative of R—Y signal information at a first predetermined phase, representative of B—Y signal information at a second predetermined phase, and representative of G—Y signal information at a third predetermined phase, said receiver also including a source of reference oscillations of said color subcarrier frequency, and color signal utilization means requiring the delivery of R—Y, B—Y and G—Y signals, respectively, to the respective first, second and third input terminals thereof, the combination comprising: first and second demodulating means for heterodyning said modulated subcarrier wave with reference oscillations to produce respectively different color difference signal outputs in respectively separate output circuit means, means for applying modulated color subcarrier waves from said chrominance signal source to each of said first and second demodulating means, means for separately applying to each of said first and second demodulating means reference oscillations of respectively different selected phases different from any of said first, second and third predetermined phases whereby the heterodyning action in each of said demodulating means is such as to produce respective color signal outputs in the respective separate output circuit means which are representative of signal information other than said R—Y, B—Y and G—Y signals in the absence of interaction between said first and second demodulating means, and means for causing interaction between said first and second demodulating means such that the color signal outputs produced in the respectively separate output circuit means of said first and second demodulating means are representative of different ones of said R—Y, B—Y and G—Y signals, said interaction causing means comprising impedance means common to both of said first and second demodulating means for combining signals from both said first and second demodulating means and for influencing said signal production in both of said respectively separate output circuits, means for deriving the remaining one of said R—Y, B—Y and G—Y signals from said common impedance means, and means for supplying the required signal information to each of said first, second and third input terminals from the respectively appropriate one of said separate output circuit means and output signal deriving means.

5. Apparatus in accordance with claim 4 wherein said first input terminal is coupled to the separate output circuit means of said first demodulating means, said second input terminal is coupled to the separate output circuit means of said second demodulating means, and said third input terminal is coupled to said third color signal output deriving means, and wherein both of said selected phases in which reference oscillations are respectively applied to said first and second demodulating means are intermediate said first and second predetermined phases.

References Cited in the file of this patent

UNITED STATES PATENTS

| | | |
|---|---|---|
| 2,718,546 | Schlesinger | Sept. 20, 1955 |
| 2,742,524 | Sziklai | Apr. 17, 1956 |
| 2,779,818 | Adler | Jan. 29, 1957 |
| 2,832,819 | Seely | Apr. 29, 1958 |
| 2,845,481 | Lockhart | July 29, 1958 |
| 2,858,428 | Torre | Oct. 28, 1958 |
| 2,877,347 | Clark | Mar. 10, 1959 |
| 2,896,013 | Parker | July 21, 1959 |

FOREIGN PATENTS

| | | |
|---|---|---|
| 729,271 | Great Britain | May 4, 1955 |
| 748,060 | Great Britain | Apr. 18, 1956 |

UNITED STATES PATENT OFFICE
CERTIFICATE OF CORRECTION

Patent No. 3,020,338 February 6, 1962

Roland N. Rhodes

It is hereby certified that error appears in the above numbered patent requiring correction and that the said Letters Patent should read as corrected below.

Column 1, line 24, for "color", first occurrence, read -- method --; line 31, for "uses" read -- by use of --; column 2, line 1, for "color-different" read -- color difference --; line 42, for "color-different" read -- color-difference --; column 3, line 12, after "color-difference" insert -- signals --; line 17, for "produce" read -- produces --; column 4, line 60, strike out "the", first occurrence.

Signed and sealed this 24th day of November 1964.

(SEAL)
Attest:

ERNEST W. SWIDER
Attesting Officer

EDWARD J. BRENNER
Commissioner of Patents

Notice of Adverse Decision in Interference

In Interference No. 94,017 involving Patent No. 3,020,338, R. N. Rhodes, COLOR TELEVISION DEMODULATION SYSTEM, final judgment adverse to the patentee was rendered July 30, 1965, as to claims 2 and 4.

[*Official Gazette September 28, 1965.*]